(12) United States Patent
Keckeisen et al.

(10) Patent No.: US 7,608,317 B2
(45) Date of Patent: Oct. 27, 2009

(54) MULTILAYER PACKAGING WITH PEELABLE COUPON

(75) Inventors: Michael S. Keckeisen, Neenah, WI (US); Stephanie L. Emenecker, Neenah, WI (US); Kenneth E. Kiesow, Neenah, WI (US)

(73) Assignee: Milprint, Inc., Oshkosh, WI (US)

( * ) Notice: Subject to any disclaimer, the term of this patent is extended or adjusted under 35 U.S.C. 154(b) by 0 days.

(21) Appl. No.: 11/846,350

(22) Filed: Aug. 28, 2007

(65) Prior Publication Data

US 2008/0075897 A1    Mar. 27, 2008

Related U.S. Application Data

(63) Continuation of application No. PCT/US2006/006913, filed on Feb. 28, 2006.

(51) Int. Cl.
*B32B 3/24* (2006.01)
*B32B 38/04* (2006.01)
*B32B 3/14* (2006.01)
*B65D 65/28* (2006.01)
*B65D 65/22* (2006.01)

(52) U.S. Cl. ............... 428/136; 428/35.7; 428/43; 428/42.2; 156/250; 383/111; 283/101

(58) Field of Classification Search ............ 428/136, 428/35.7, 43, 42.2; 156/250; 383/111; 283/101
See application file for complete search history.

(56) References Cited

U.S. PATENT DOCUMENTS

| | | | |
|---|---|---|---|
| 2,391,539 A | 12/1945 | Avery | |
| 3,110,121 A | 11/1963 | Corinet | |
| 3,879,246 A | 4/1975 | Walker | |
| 4,103,820 A | 8/1978 | Mathison et al. | |
| 4,163,884 A | 8/1979 | Kartanson | |
| 4,182,222 A | 1/1980 | Stahl | |
| 4,256,791 A | 3/1981 | Holmstrom et al. | |
| 4,306,367 A | 12/1981 | Otto | |
| 4,308,679 A | 1/1982 | Ray, III et al. | |
| 4,324,823 A | 4/1982 | Ray, III | |
| 4,336,664 A | 6/1982 | Penick et al. | |

(Continued)

FOREIGN PATENT DOCUMENTS

GB      13999922      7/1975

(Continued)

*Primary Examiner*—William P Watkins, III
(74) *Attorney, Agent, or Firm*—Christine E. Parsons

(57) ABSTRACT

A multilayer film with an integrated peelable coupon that may be used as a packaging unit for products is described. The flexible, multilayer film has at least a first polymeric layer, indicia, a layer of release coating that is applied in a pattern to a portion of an interior surface of the first layer and a second polymeric layer which may be made in combination with additional layers. A removable portion of the film structure is provided by a pattern of perforations or slits through certain layers of film in alignment with the release coating pattern. The method of manufacturing the multilayer film with an integrated coupon includes providing a first polymeric layer as an outer layer, printing indicia, applying a layer of release coating in a pattern to a portion of an interior surface of the first layer, cutting slits through certain layers and laminating a second polymeric layer.

19 Claims, 5 Drawing Sheets

U.S. PATENT DOCUMENTS

| | | | |
|---|---|---|---|
| 4,345,393 A | 8/1982 | Price et al. |
| 4,648,548 A | 3/1987 | Shin |
| 4,726,171 A | 2/1988 | Kreager et al. |
| 4,767,654 A | 8/1988 | Riggsbee |
| 4,993,845 A | 2/1991 | Faltynek |
| 5,007,578 A | 4/1991 | Simone |
| 5,021,274 A | 6/1991 | Beck et al. |
| 5,028,076 A | 7/1991 | Danelski |
| 5,035,515 A | 7/1991 | Crossman et al. |
| 5,076,433 A | 12/1991 | Howes |
| 5,076,613 A | 12/1991 | Kovacs |
| 5,127,743 A | 7/1992 | Miller et al. |
| 5,267,898 A | 12/1993 | Doll et al. |
| 5,282,917 A | 2/1994 | Danelski |
| 5,341,930 A | 8/1994 | Counts et al. |
| 5,474,183 A | 12/1995 | Warren et al. |
| 5,484,167 A | 1/1996 | Donaldson et al. |
| 5,536,546 A | 7/1996 | Nash |
| 5,676,401 A | 10/1997 | Witkowski et al. |
| 5,697,549 A | 12/1997 | Yocum |
| 5,871,096 A | 2/1999 | Yakich |
| 5,882,118 A | 3/1999 | Daniels et al. |
| 5,907,944 A | 6/1999 | Giacoman |
| 5,974,003 A | 10/1999 | Pedicano et al. |
| 6,041,575 A | 3/2000 | Vonderhorst et al. |
| 6,041,929 A | 3/2000 | Brunner et al. |
| 6,047,488 A | 4/2000 | Tuszkiewicz |
| 6,068,181 A | 5/2000 | Cai |
| 6,068,584 A | 5/2000 | Daniels et al. |
| RE36,876 E | 9/2000 | Daniels et al. |
| 6,206,570 B1 | 3/2001 | Cortopassi |
| 6,227,707 B1 | 5/2001 | Anderson |
| 6,230,474 B1 | 5/2001 | Giacoman |
| 6,251,450 B1 | 6/2001 | Giacoman |
| 6,267,243 B1 | 7/2001 | Sumpmann et al. |
| 6,270,821 B1 | 8/2001 | Grip et al. |
| 6,327,801 B1 | 12/2001 | Witkowski |
| 6,383,592 B1 | 5/2002 | Lowry et al. |
| D458,120 S | 6/2002 | Knoerzer |
| 6,406,062 B1 | 6/2002 | Brooks et al. |
| 6,420,006 B1 | 7/2002 | Scott |
| 6,457,585 B1 | 10/2002 | Huffer et al. |
| 6,467,614 B1 | 10/2002 | Tallier et al. |
| 6,470,653 B1 | 10/2002 | Lutz et al. |
| 6,722,495 B2 | 4/2004 | Fresnel |
| 6,746,743 B2 * | 6/2004 | Knoerzer et al. ........... 428/42.1 |
| 7,189,300 B2 | 3/2007 | Knoerzer et al. |
| 7,228,961 B2 | 6/2007 | Koetter et al. |
| 7,416,768 B2 | 8/2008 | Knoerzer et al. |
| 2004/0159569 A1 | 8/2004 | Mahood |
| 2004/0251158 A1 | 12/2004 | Boundy et al. |
| 2005/0008798 A1 | 1/2005 | Nowak |
| 2005/0025941 A1 | 2/2005 | Nowak |
| 2006/0133701 A1 | 6/2006 | Daniels |
| 2006/0285780 A1 | 12/2006 | Knoerzer et al. |

FOREIGN PATENT DOCUMENTS

JP 62062736 3/1987

* cited by examiner

MULTILAYER PACKAGING WITH PEELABLE COUPON

This application is a continuation of International Application PCT/US2006/006913 with an international filing date of Feb. 28, 2006.

BACKGROUND OF THE INVENTION

The present disclosure relates to a film with an integrated peelable coupon. More particularly, the disclosure relates to a multilayer film having at least a first layer, indicia printed on the first layer, a layer of release coating applied in a pattern to the interior surface of (or to the indicia printed on) the first layer and another polymeric layer, resulting in a peelable portion of the film structure from a pattern of perforations or slits through certain layers of the multilayer film.

Packaging is becoming more sophisticated to keep up with promotional requests from marketers of products. Cost-effective promotions may generate excitement for a product and increase sales. Packaging for products should be consumer friendly and easy to use. One pertinent area includes coupons that may be peeled from packaging film to reveal a store coupon, sweepstakes prize or other promotional item.

Store coupons or game pieces have been inserted as separate items in packaging units with the promotion advertised on the outside of the packaging units. This technique readily allows for different store coupons or unique game pieces to be inserted as separate items. But the separate insertion complicates processing, and often pieces are not inserted in every packaging unit. Also, store coupons or game pieces have been adhered to the outside of packaging units as labels. But with this technique, store coupons or game pieces may be removed by non-customers who remove the label without purchasing the product. Store coupons or game pieces have been incorporated and/or inserted into packaging units as promotions to avoid these concerns and to encourage purchase of the product.

Multilayer films may be used to produce packaging units, such as bags, for packaging food or other items. Different layers have distinct properties; and continuous layers, such as metallized polypropylene, are known to have barrier properties. The layers of multilayer films may be adhesive or extrusion laminated.

Extrusion lamination involves using a thin, polymeric layer, typically polyethylene, to bond to other layers of film or foil. Extrusion lamination has certain benefits over adhesive lamination in producing multilayer films, such as building a thicker and stronger multilayer lamination. Also, preferable to adhering separate layers together, extrudates may have cost advantages and fewer environmental issues over adhesives. Therefore, it may be preferable to avoid adhesives in producing multilayer films.

However, adhesive lamination has certain benefits over extrusion lamination. Adhesive lamination involves using an adhesive, such as acrylic, urethane or polyester, to bond layers of film or foil. Adhesive lamination may be preferable to extrusion lamination. It may facilitate technically easier converting when scoring particular structures, such as polyethylene, or when bonding materials that are incompatible with extrusion lamination. Additionally, adhesive lamination may provide for a thinner, non-bulky, multilayer film, as it need not contain an extrudate layer.

An example film structure for a packaging unit is an outer layer of clear oriented polypropylene, ink or indicia reverse printing, an extrudate of polyethylene and a layer of metallized oriented polypropylene. The metallized polypropylene layer provides barrier properties. This packaging unit may be used for items including, but not limited to, salty snacks.

Another example film structure for a packaging unit is an outer layer of polyethylene, ink or indicia surface printing, an adhesive and a layer of oriented polypropylene. This packaging unit may be used for items including but not limited to individually-wrapped items, such as, by way of non-limiting example, candies or small chocolate bars, or other items, including but not limited to non-greasy snacks. This packaging unit may comprise the second packaging unit when items are individually wrapped.

U.S. Pat. No. 6,746,743 (Knoerzer, et. al.) and U.S. patent application Ser. No. 11/145,399 (published as US 2006/0285780) (the '399 application) disclose a flexible container with a wall structure comprised of multilayer, flexible, thin film, including a first layer that is affixed to the wall structure by a releasable adherence and that incorporates a removable promotional piece. The multilayer film incorporates a promotional piece, defined by a continuous cut, into the exterior layer of the container and releasable at any cross-section of the container. Removal of the removable portion of the multilayer film does not compromise the barrier properties of the container. The '399 application also discloses the use of variable peel forces.

U.S. Pat. No. 6,041,929 (Brunner, et. al.) discloses a flexible film laminate including an exterior layer, an interior layer and an adhesive layer for attaching the two layers. The adhesive layer includes a non-adhesive portion where the exterior layer is not adhered to the interior layer where a hidden printed indicia portion contacts the interior layer. The indicia portion is printed on the interior surface of the exterior layer. A gray block layer obscures the indicia portion. Another ink layer is disposed on the gray block layer.

U.S. Pat. No. 5,127,743 (Miller, et. al.) discloses a package comprised of multilayer, flexible film where a promotional piece is positioned between, but not adhered to, adjacent layers. The promotional piece may be a game card, coupon, paper advertisement or any other item capable of being placed between and held in position by two layers. Upon extrusion lamination, two layers surround the piece and act to hold it firmly in place; and the piece is therefore built into the package wall.

U.S. Pat. No. 7,189,300 (Knoerzer, et. al.) discloses a package comprising a first layer and a second layer laminated together by a third layer, where two parallel, continuous, complete cuts extend through the first layer but not through the second layer; and the strip formed by the cuts may be removed from the exterior layer of the package.

It is desirable to produce a multilayer film with a peelable coupon that is easy to make and easy to use. Incorporating the coupon into the outer layer of the film lowers material and processing costs compared with designs employing a promotional piece that is separately inserted in the packaging unit or between layers of film.

BRIEF SUMMARY OF THE INVENTION

The present invention is a multilayer film with an integrated peelable coupon. The multilayer film may be used as a packaging unit for products. The flexible, multilayer film has at least a first layer, indicia, a layer of release coating that is applied in a pattern to a portion of an interior surface of the first layer (or its indicia) and a second polymeric layer which may be made in combination with additional layers. A removable portion of the multilayer film is provided by a pattern of perforations or slits (including score lines) through certain layers of the multilayer film in alignment with the release coating pattern. In one embodiment, the multilayer film may form a web with repeating units so different indicia may be printed on each portion of the interior surface that corresponds to each row of removable portions or peelable coupons.

A method of manufacturing a multilayer film with an integrated peelable coupon includes providing a first polymeric layer as an outer layer, applying indicia, applying a layer of release coating in a pattern to a portion of an interior surface of (or indicia printed on) the first polymeric layer, cutting slits lines through certain layers and extrusion or adhesive laminating a second polymeric layer. In one embodiment, two parallel slits are cut an entire length of the film so the second polymeric layer has a removable banner strip defined by slits through the outer layer and the indicia and into the layer of release coating. Also, the second layer or other additional layers may have a different appearance from an exterior surface of the outer layer.

BRIEF DESCRIPTION OF DRAWINGS

The features of this disclosure and the manner of obtaining them will become more apparent, and the disclosure itself will be best understood by reference to the following description of embodiments of a film with an integrated peelable coupon taken in conjunction with the accompanying drawings showing embodiments of the film, where.

DETAILED DESCRIPTION OF THE INVENTION

While the present invention will be fully described hereinafter with reference to the accompanying drawings, in which embodiments are shown, it is to be understood at the outset that persons skilled in the art may modify the embodiments disclosed herein while still achieving the desired result. Accordingly, the description that follows is to be understood as a broad informative disclosure directed to persons skilled in the appropriate art and not as a limitation of the present disclosure.

Figure 1:
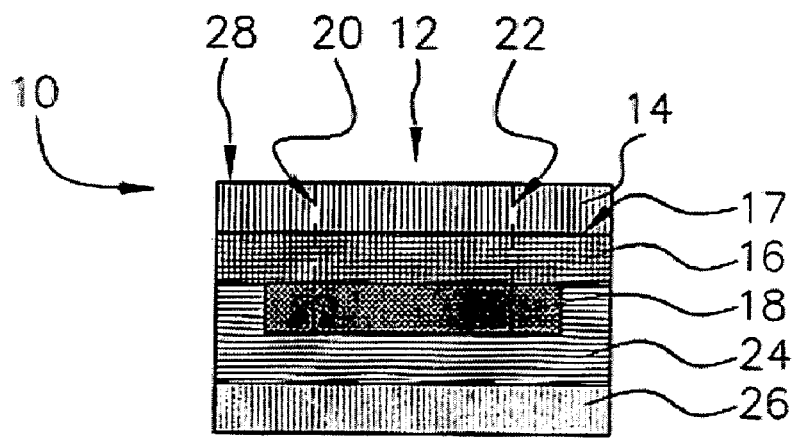
FIG. 1 shows a cross-sectional view of a first embodiment of a multilayer film.
Figure 2:
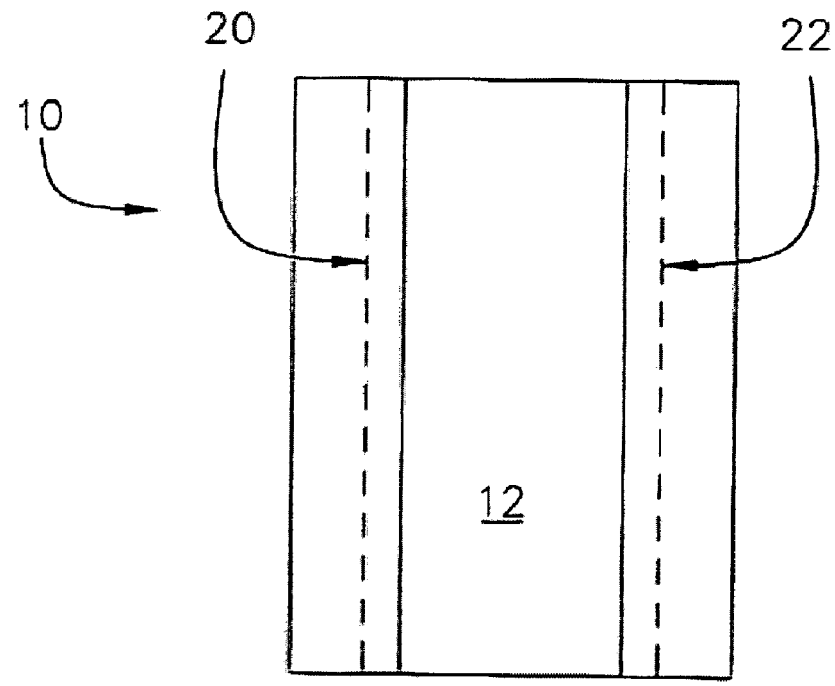
FIG. 2 shows a planar view of a multilayer film.

Referring now to the drawings, FIG. 1 shows a cross-sectional view of an embodiment of a multilayer film 10, and FIG. 2 shows a planar view of this multilayer film 10. The dimensions in all drawings are for illustration purposes only and are not necessarily to scale. Additionally, like reference numbers illustrate corresponding or similar elements throughout the drawings. FIG. 1 shows a multilayer film 10 with a peelable coupon 12, which is broadly defined as any removable or peelable section. In one embodiment, the peelable coupon 12 is adhesive-free so it is not tacky when removed. The multilayer film 10 has an outer layer 14, preferably thermoplastic, such as, by way of non-limiting example, an oriented polypropylene, polyethylene or other suitable film.

The term "outer layer" does not necessarily mean the outermost layer of the multilayer film 10. Outer layer is broadly defined as any layer forming at least a portion of an exterior layer of a packaging unit or a portion of an interior layer of a packaging unit. Packaging unit is broadly defined as a device used to wholly or partially surround food or another item. For example, packaging units may include bags that wholly surround an item (or items) to be packaged; packaging units may also include films that partially surround an item (or items) to be packaged and, when used in conjunction with another material (such as a tray), wholly surround an item (or items). As stated above, the outer layer of a packaging unit may be an exterior layer of a packaging unit or an interior layer of a packaging unit. Exterior layer is defined broadly as a layer comprising the outermost surface of a packaging unit, and interior layer is defined broadly as a layer comprising the innermost surface of a packaging unit. Additionally, the exterior layer and the interior layer each have an interior surface and an exterior surface. Interior surface is defined broadly as a surface adjacent to another layer, and exterior surface is defined broadly as a surface not adjacent to another layer.

Referring again to FIG. 1, indicia 16, such as words, logos, patterns, trademarks, etc., may be applied to an interior surface 17 of the outer layer 14. The indicia 16 may be either reverse printed or surface printed on the interior surface 17 of the outer layer 14. If the outer layer 14 is the exterior layer of a packaging unit, reverse printing may be preferred. If the outer layer 14 is the interior layer of a packaging unit, surface printing may be preferred. In either case, flexographic printing is one printing process; but other known methods, such as rotogravure printing, may also be used.

A layer of release coating 18 is applied in a pattern on a portion of the interior surface 17 of the outer layer 14 and over a portion of the indicia 16. The release coating 18 may be silicone, release varnish, release lacquer or any other release agent. An example release lacquer is Flexcon release lacquer RMW94546 from Flint Ink North America. A primer may be applied between any layers as necessary to avoid adhesion failures for certain substrates, but a suitable ink for the indicia 16 may serve the same function as a primer.

The peelable coupon 12 is formed by slits 20 and 22 through the outer layer 14 and the indicia 16 and into the layer of release coating 18, where the slits 20 and 22 are in alignment with the pattern of the layer of release coating 18. The controlled penetration of slits 20 and 22 does not go though all layers of the multilayer film 10; but, in one embodiment, the slits 20 and 22 go completely through the layer of release coating 18. Slits 20 and 22 may include perforations with intact portions of multilayer film 10 between each slit.

A second polymeric layer 24 is bonded to the outer layer 14 on the interior surface 17 having the indicia 16 and release coating 18. The second polymeric layer 24 may be an extrudate of polyethylene. The second polymeric layer may also be oriented polypropylene adhesive laminated to the outer layer 14. Many other suitable materials may be used for this second polymeric layer 24.

The second polymeric layer 24 may or may not be strong enough to ensure no compromise of the barrier or other characteristics of the multilayer film 10. Therefore, additional layers may be added, such as an additional layer 26, that are continuous to maintain barrier integrity or other properties. As a non-limiting example, the additional layer 26 may be a metallized oriented polypropylene. The additional layer 26 may be a single layer or multiple layers of various suitable materials.

The second polymeric layer 24 or the additional layer 26 under the section of the outer layer 14 comprising the peelable coupon 12 may have a different appearance so it is apparent to a consumer when the peelable coupon 12 has been removed.

This may result from the discontinuity of ink when a portion of the indicia 16 is removed with the peelable coupon 12. Other methods may result in the exterior surface 28 of the outer layer 14 appearing distinct from second polymeric layer 24 or the additional layer 26 under the peelable coupon 12. For example, the second polymeric layer 24 or the additional layer 26 (if the second polymeric layer 24 is translucent or clear) may have a different appearance from an exterior surface 28 of the outer layer 14. Also, the multilayer film 10 may be printed on the exterior surface 28 and/or the interior surface 17 of the outer layer 14.

Figure 5:
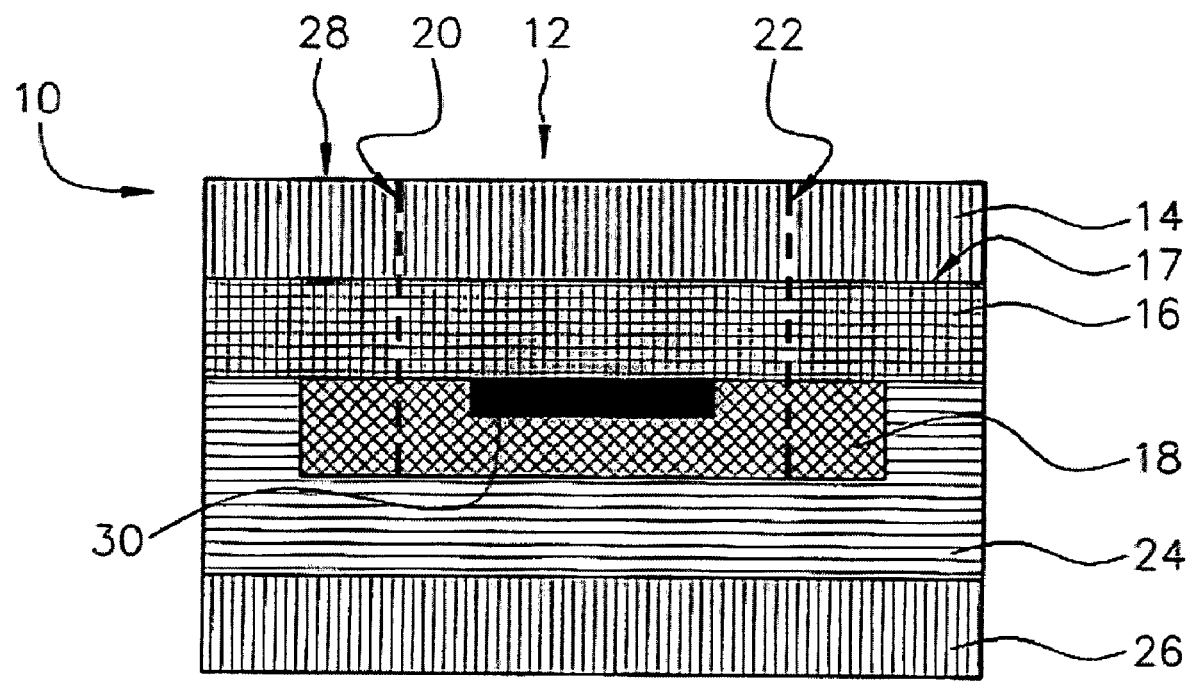
FIG. 5 shows a cross-sectional view of a second embodiment of a multilayer film.

FIG. 5 shows a cross sectional view of a multilayer film 10 with a peelable coupon 12 wherein the multilayer film 10 includes a printed code or pattern of ink 30. Indicia 16 may be applied on an interior surface 17 of the outer layer 14; another pattern of ink 30 may be printed on the indicia 16. Pattern of ink 30 may be ink jet printed to reflect a unique code on a web 40 (see FIG. 3) of continuous film used to produce numerous packaging units. Indicia 16 may be opaque and continuous so that pattern of ink 30 cannot be viewed through the outer layer 14.

Figure 3:
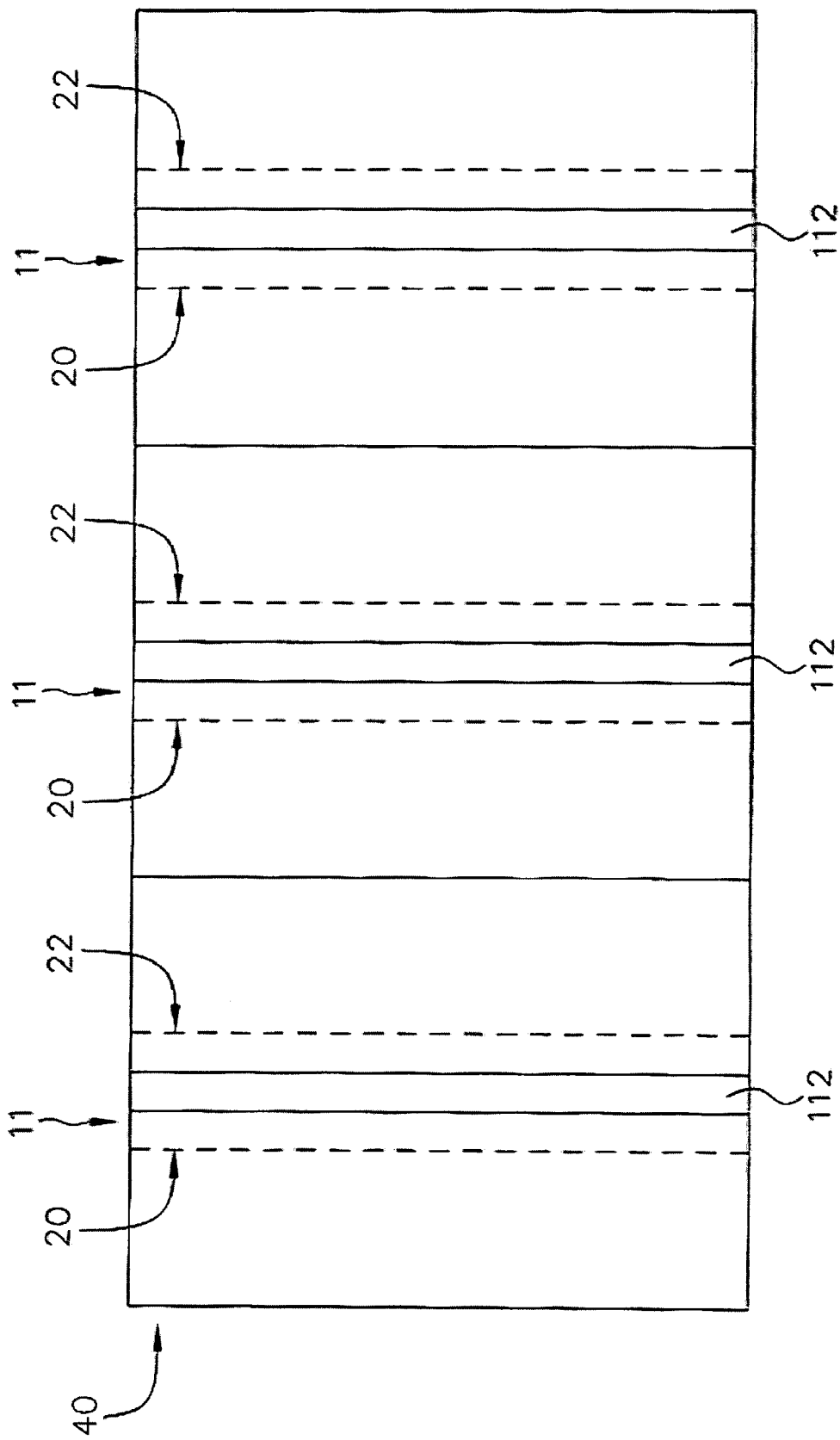
FIG. 3 shows a planar view of a web with three sections.
Figure 4:
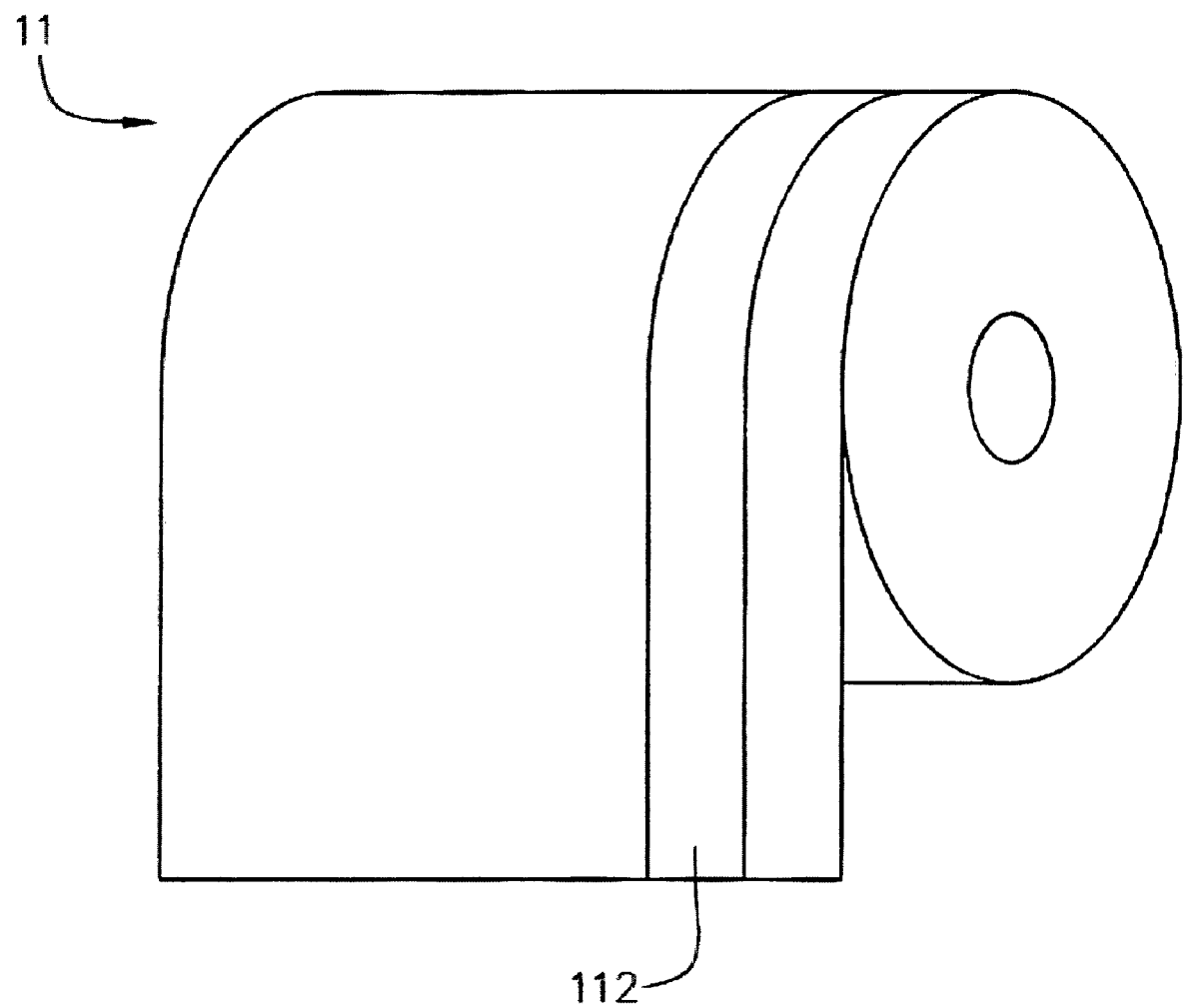
FIG. 4 shows a roll of multilayer film with a removable banner.

Packaging film may be produced on a web with repeating patterns that then form packaging units. FIG. 3 shows a planar view of web 40 of the multilayer film 10 (of, for example, FIG. 1) with three patterns or repeating units 11. The repeating units 11 may be made in the machine direction of the web 40 or the transverse direction of the web 40. The several repeating units 11 of the web 40 may then be cut into narrower individual rolls approximating the circumference of a packaging unit to be produced. FIG. 4 shows an individual roll of one repeating unit 11 with an integrated removable banner 112. The roll of film may then be used to form packaging units.

In FIG. 3, the slits 20 and 22 extend across an entire surface of each repeating unit 11, and the slits 20 and 22 are parallel to edges of the stripe of the layer of release coating 18 (in, for example, FIG. 1). Each repeating unit 11 may be formed with a removable banner 112 that extends the entire length of the repeating unit 11. As an example, the release coating 18 may be applied to three repeating units 11 on the web 40 to form a 2.25 inch strip or removable banner 112 in the machine direction for each repeating unit 11.

For this example, three patterns of release coating 18 may be applied in stripes on a portion of the interior surface 17 of the outer layer 14 of the multilayer film 10 (in, for example, FIG. 1) of web 40. Each repeating unit 11 of the web 40, although repeating, need not be exactly the same. Each repeating unit 11 may have different indicia 16 or pattern of ink 30 (see FIGS. 1 and 5) on each portion of the interior surface 17 of the outer layer 14 that is between the slits 20 and 22. For this example, three sets of redeemable store coupons or game pieces may be printed for each row of removable banner 112 without changing the printing in the machine direction.

In final form, it is contemplated that the peelable coupon 12 (of, for example, FIG. 1) may be delaminated from a packaging unit formed of the repeating unit 11 of FIGS. 3 and 4 by peeling a corner of the peelable coupon 12 at either its top or bottom. If the second polymeric layer 24 or the additional layer 26 under the peelable coupon 12 has a different appearance than the exterior surface 28 of the outer layer 14, it will be readily apparent to the consumer whether the peelable coupon 12 has been removed.

Figure 6:
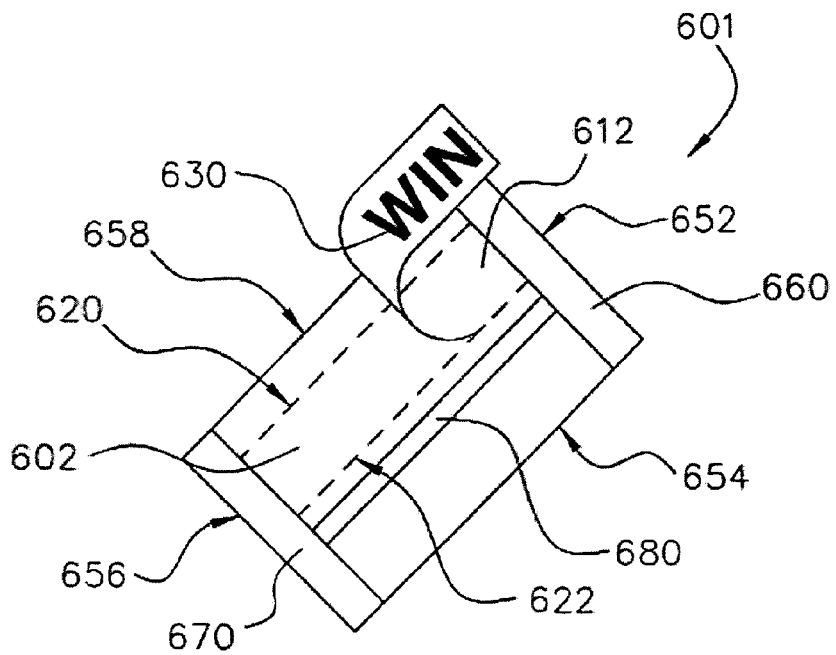
FIG. 6 shows a perspective view of a first embodiment of a peelable coupon being removed from a packaging unit.

FIG. 6 shows a packaging unit 601 with a peelable coupon 612 having one example of a pattern of ink 630. The peelable coupon 612 is shown as being removed from the exterior layer 602 of the packaging unit 601. Slits 620 and 622 facilitate removal of the peelable coupon 612. The packaging unit 601 has sides 652, 654, 656 and 658; a first end seal 660; an opposing second end seal 670; and a fin seal 680. The fin seal 680 traverses the distance between, and may overlap, the first end seal 660 and the opposing second end seal 670. In an alternate embodiment, the end seals 660 and 670 may be side seals.

Figure 7:
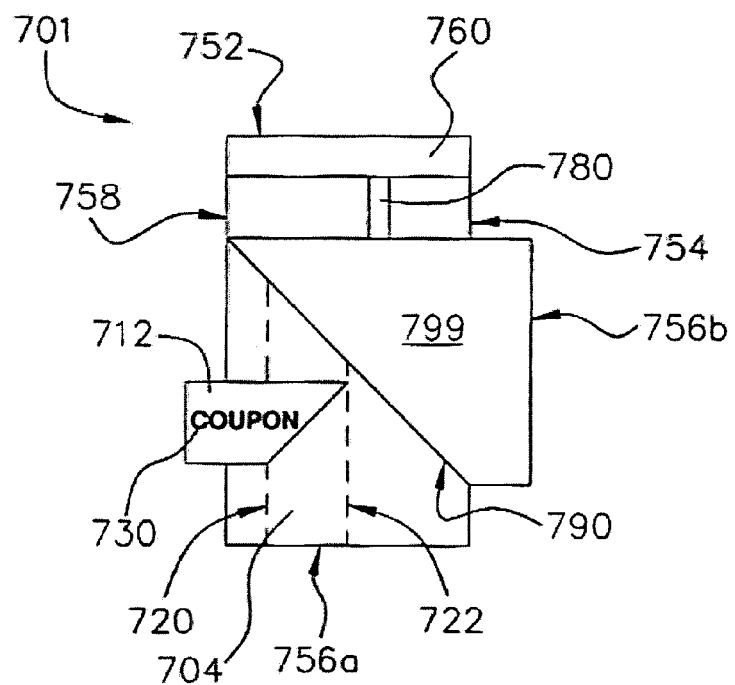
FIG. 7 shows a perspective view of a second embodiment of a peelable coupon being removed from a packaging unit.

FIG. 7 shows a packaging unit 701 with a peelable coupon 712 having a second example of a pattern of ink 730. The packaging unit 701 is shown as being opened with an area 799 folded back at fold line 790 in order to show the peelable coupon 712 as being removed from the interior layer 704 of the packaging unit 701. Slits 720 and 722 facilitate removal of the peelable coupon 712. The packaging unit 701 has sides 752, 754, 756 (shown as 756a and 756b) and 758; a first end seal 760; and a fin seal 780. The fin seal 780 traverses the distance between, and may overlap, the first end seal 760 and an opposing second end seal. The second end seal is not shown, as the packaging unit 701 is shown as opened at the second end seal. The separation of side 756 as 756a and 756b depicts the opening of the second end seal. In an alternate embodiment, the first end seal 760 and the second end seal may be side seals.

A multilayer film 10 with a peelable coupon 12 may be manufactured using the steps of (1) providing a first layer as an outer layer 14, (2) applying indicia 16 on an interior surface 17 of the outer layer 14, such as by reverse printing or surface printing, (3) applying a layer of release coating 18 in a pattern to a portion of the interior surface 17 of the outer layer 14 and over a portion of the indicia 16, (4) cutting slits 20 and 22 through the outer layer 14 and the indicia 16 and into or through the layer of release coating 18, where the slits are in alignment with the pattern of the layer of release coating 18, and (5) extrusion or adhesive laminating to the outer layer 14 having the indicia 16 and the layer of release coating 18 a second polymeric layer 24 having an optional opaque or partially opaque surface. In one embodiment, the slits 20 and 22 may be cut as part of the lamination process. The cutting or scoring may be performed with a mechanical or laser cutting tool to define the peelable coupon 12/removable banner 112. In one method, two parallel slits 20 and 22 are cut the entire length of the multilayer film 10 so the second polymeric layer 24 forms the base for the peelable coupon 12/removable banner 112, which is defined by the slits 20 and 22 in a line through the outer layer 14 and the indicia 16 and into or through the layer of release coating 18. The slits 20 and 22 may be cut in the machine direction of a web 40 or in the transverse direction. Optional continuous cutting in the machine direction allows a mechanical or laser cutting tool to be continuously applied to the web 40.

Various additional types of printing may be used to enhance the desired features. The method may include the step of printing a unique code or pattern of ink 30 for each repeating unit 11 of a web 40 for either surface of the removable banner 112. As such, different game pieces or amounts of savings may be produced on or in the web 40. Numerous and different indicia 16 may be printed on a single web 40, including different indicia 16 under each removable banner 112.

The method may also have the additional step of printing on an exterior surface 28 of the outer layer 14. The printing on the exterior surface 28 of a portion of the outer layer 14 encompassing the peelable coupon 12 may have a printed entitlement, such as a cash refund or other information. Also, lines may be printed as a guide for cutting slits 20 and 22 during manufacture or as border for the peelable coupon 12 for the customer to remove. The indicia 16 may be printed in repeating patterns on each repeating unit 11 for each packaging unit that may be formed from the web 40.

Although embodiments of the disclosure are illustrated and described in connection with particular features, they may be adapted for use with a wide variety of films and packaging units. Other embodiments and equivalents of the multilayer film and peelable coupon and related methods of making the multilayer films are envisioned within the scope of the claims. Various features of the disclosure have been particularly shown and described in connection with illustrated embodiments. However, it must be understood that the particular examples merely illustrate the invention and that the invention is to be given its fullest interpretation within the terms of the claims.

What is claimed is:

1. A multilayer film with a peelable coupon comprising:
    an outer polymeric, thermoplastic layer wherein the outer layer comprises an innermost surface of a packaging unit,
    indicia surface printed on an interior surface of the outer layer,
    a layer of release coating in a pattern on a portion of the interior surface of the outer layer having the indicia,
    the peelable coupon formed by slits through the outer layer and the indicia and into the layer of release coating,
        wherein the slits are in alignment with the pattern of the layer of release coating,
    and a second polymeric layer bonded to the outer layer.

2. The film of claim 1 wherein the release coating is a silicone, a release varnish, a release lacquer or any other release agent.

3. The film of claim 1 wherein the outer layer is a polyethylene or an oriented polypropylene.

4. The film of claim 1 wherein the second polymeric layer is an extrudate of polyethylene or an oriented polypropylene adhesive laminated to the outer layer.

5. The film of claim 1 further comprising printing on an exterior surface of a portion of the outer layer encompassing the peelable coupon.

6. The film of claim 1 further comprising an additional layer.

7. The film of claim 6 wherein the additional layer is continuous to maintain barrier integrity.

8. The film of claim 7 wherein the additional layer is metallized oriented polypropylene.

9. The film of claim 1 wherein the second polymeric layer has a different appearance from an exterior surface of the outer layer so the removal of the peelable coupon is apparent.

10. A multilayer film with an integrated removable banner suitable for forming a packaging unit, the film forming a web with repeating units, each repeating unit of the web comprising:
    an outer polymeric, thermoplastic layer wherein the outer layer comprises an innermost surface of the packaging unit,
    indicia surface printed on an interior surface of the outer layer,
    a layer of release coating in a stripe on a portion of the interior surface of the outer layer having the indicia,
    and a second polymeric layer bonded to the outer layer,
        wherein the integrated removable banner is formed by slits through the outer layer and the indicia and into the layer of release coating,
        wherein the slits extend across an entire surface of the repeating unit and the slits are parallel to edges of the stripe of the layer of release coating.

11. The film of claim 10 wherein each repeating unit has different indicia on each portion of the interior surface of the outer layer that is between the slits.

12. The film of claim 10 wherein the release coating is a silicone, a release varnish, a release lacquer or any other release agent.

13. The film of claim 10 wherein the outer layer is a polyethylene or an oriented polypropylene.

14. The film of claim 10 wherein the second polymeric layer is an extrudate of polyethylene or an oriented polypropylene adhesive laminated to the outer layer.

15. The film of claim 10 further comprising printing on an exterior surface of a portion of the outer layer encompassing the integrated removable banner.

16. The film of claim 10 further comprising an additional layer.

17. The film of claim 16 wherein the additional layer is continuous to maintain barrier integrity.

18. The film of claim 17 wherein the additional layer is metallized oriented polypropylene.

19. The film of claim 10 wherein the second polymeric layer has a different appearance from an exterior surface of the outer layer so it is apparent when the integrated removable banner has been removed.

* * * * *